UNITED STATES PATENT OFFICE.

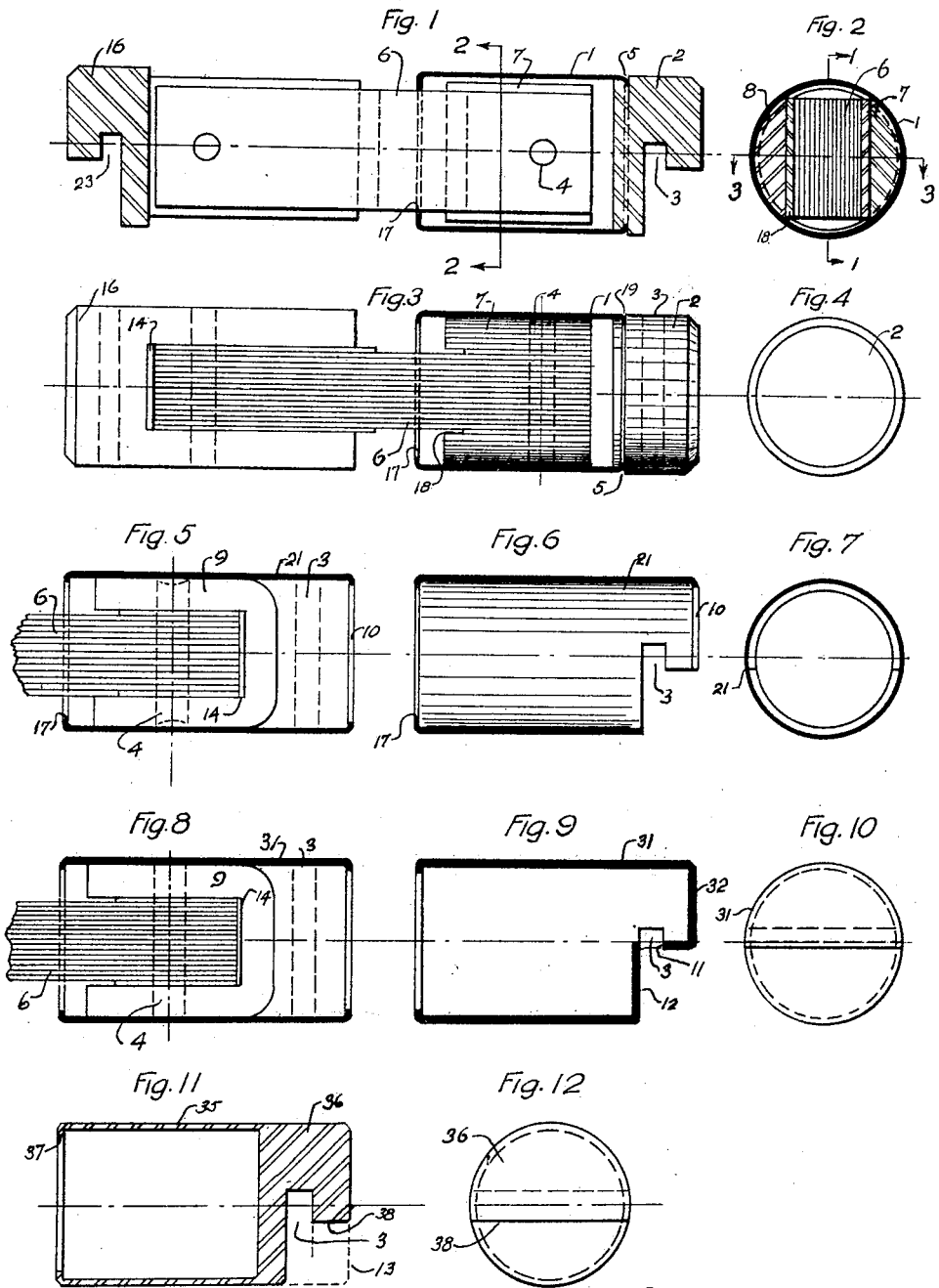

JOHN J. SERRELL, OF ELIZABETH, AND ALFRED W. SHEPHERD, OF MAPLEWOOD, NEW JERSEY, ASSIGNORS TO SMITH & SERRELL, OF MAHWAH, NEW JERSEY, A COPARTNERSHIP CONSISTING OF SAID SERRELL AND ROBERT A. SMITH.

FLEXIBLE COUPLING PIN.

1,404,659.   Specification of Letters Patent.   Patented Jan. 24, 1922.

Application filed March 18, 1921. Serial No. 453,296.

*To all whom it may concern:*

Be it known that we, JOHN J. SERRELL, of Elizabeth, Union County, State of New Jersey, and ALFRED W. SHEPHERD, of Maplewood, Essex County, State of New Jersey, citizens of the United States, have made a new and useful Invention Relating to Flexible Coupling Pins, of which the following is a specification, taken in connection with the accompanying drawing, which forms part of the same.

This invention relates especially to coupling pins for flexible couplings of the general type shown in the Smith Patent No. 1,165,551 of December 28, 1915 and in which one or more of the keepers cooperating with the ends of the laminated or other spring connector is enclosed, and more or less freely movable, within a sheet metal or other metallic bushing. The keeper which may be pivotally connected to the resilient or spring connector may be given a limited longitudinal movement within this bushing, while being preferably retained therein as by an integral retainer flange on the bushing which may if desired be provided with a separate or integral member constituting the pin end and which may be formed with a locking slot or device. In this way the bushing which may be of brass, bronze or other suitable material anchored or fastened if desired within the cooperating member, may constitute a removable bearing member, within which the cooperating keeper may slide and these parts may be so arranged that endwise movement takes place largely or wholly within this removable bushing so that wear on the holes in the coupling members themselves may be minimized or prevented.

In the accompanying drawing showing in a somewhat diagrammatic way various illustrative embodiments of the invention, Fig. 1 is a longitudinal section through an illustrative coupling pin taken substantially along the line 1—1 of ig. 2.

Fig. 2 is a transverse section thereof taken along the line 2—2 of Fig. 1.

Fig. 3 is a top view parts being shown in section; and

Fig. 4 is an end view thereof.

Fig. 5 is a top view partly in section showing another construction.

Fig. 6 is a transverse sectional view of the bushing thereof

Fig. 7 is an end view of this bushing.

Fig. 8 is a top view of another construction.

Fig. 9 is a transverse sectional view of the bushing thereof.

Fig. 10 is an end view of this bushing.

Fig. 11 is a transverse sectional view of another form of bushing; and

Fig. 12 is an end view thereof.

As shown in Figs. 1 to 4 the resilient coupling pin which is of course adapted to disengageably cooperate with flexible couplings of this type, may comprise the resilient connector member such as 6 composed of movable spring strips which may be pivotally or otherwise connected to the keepers adjacent the ends of the coupling pin. As indicated in Figs. 1 and 3 one of these keepers 16 may be of solid construction having the slot 14 milled out or otherwise formed therein to accommodate the laminated connector 6. This keeper which may constitute the pin end may in some cases be formed with a suitable locking device such as the locking slot 23, with which the usual spring locking ring may cooperate as is well known in this art. The other end of the spring connector which may if desired have the reduced area contact plates 18 arranged in connection therewith, may be pivoted to the keeper sections 7, 8 as by the pin 4 and these parts may be permanently secured within the sheet metal or other bushing 1, which may have a retainer flange 17 preventing disengagement of these parts after the keeper has been inserted. In some cases it is desirable to have a separate pin end 2 secured to this bushing as by the flange 5 thereon, and this pin end may have the locking slot 3 for use in some types of flexible couplings.

Figs. 5 to 7 show another arrangement in which the U-sectioned keeper 9 may be bent around the end of the laminated spring connector 6 and loosely pivoted thereto as by the pin 4, sufficient clearance being allowed at the end of the slot 14 so that the connector can swing about the pivot to the desired extent. This keeper may be bent or formed up out of rolled steel strip having the desired cross-section so that when formed preferably in connection with a suitable die or other shaping tool, the outer surface of the keeper is given a substantially cylindrical or other contour adapted to properly cooperate with the inner surface of the bushing which may form the pin end. The bushing 21 may as illustrated in this type be formed of a single piece of drawn sheet metal such as brass, bronze or the like and the outer end of this bushing may be flanged inward as at 10 and in some cases a locking slot 3 may be milled or otherwise formed in this bushing. After the keeper has been slipped into the bushing the retainer flange 17 may be spun or swaged down sufficiently to hold the keeper in the bushing while allowing it freedom of longitudinal or angular movement with respect thereto.

Figs. 8 to 10 show another type form of one piece drawn bushing which is still more desirable for some purposes. The bushing 31 may be drawn of a single piece of sheet metal and simultaneously formed with the hollow locking projection 32 which may have a substantially diametrical wall 11, in which the locking slot 3 may be cut adjacent the inner end wall 12. This considerably stiffens and strengthens the pin end so that a more reliable and rigid bearing surface is thus provided for the keeper which may be of the U-sectioned type 9 connected as by the pivot 4 to the laminated spring connector 6.

Figs. 11 and 12 show another form of bushing 35 which may be drawn or formed with a relatively thick or solid pin end 36, which may originally be formed with the substantially cylindrical contour indicated by the dotted line 13, the slot 3 and transverse lip 38 being subsequently milled out or otherwise formed in this relatively thick head of brass or other suitable material. After inserting the connector end and keeper of any desired type or construction, the retainer flange or projections 37 may be swaged or forced inward to hold the keeper within this bushing, so that a single replaceable coupling pin is thus provided as in the other cases. In some instances the outer end of the bushing may be given a slightly larger diameter than the portion with which the keeper engages, so that this enlarged diameter or projecting portion may have a tight or force fit engagement with the cooperating pin hole so as to substantially prevent movement or wear between these parts after assembly.

This invention has been described in connection with a number of illustrative embodiments, forms, proportions, parts, shapes, materials, arrangements, methods of manufacture and use, to the details of which disclosure the invention is not of course to be limited, since what is claimed as new and what is desired to be secured by Letters Patent is set forth in the appended claims.

1. In yieldable flexible couplings, coupling pins adapted to removably cooperate with recesses in coupling members and each comprising a laminated spring connector and keepers loosely connected to the ends of said connector, one of said keepers being formed of U-sectioned metal extending around the end of said connector and having a pivot extending therethrough and through the cooperating end of said connector, and a one piece drawn sheet metal bushing loosely mounted on said U-sectioned keeper and having an inwardly projecting retainer flange to prevent disengagement from said keeper, said bushing being formed with an integral locking slot in its outer free end.

2. In yieldable flexible couplings, coupling pins adapted to removably cooperate with recesses in coupling members and each comprising a spring connector and keepers connected to the ends of said connector, one of said keepers being formed of U-sectioned metal extending around the end of said connector and having a pivot extending therethrough and through the cooperating end of said connector, and a one piece drawn sheet metal bushing loosely mounted on said U-sectioned keeper and having an inwardly projecting retainer flange to prevent disengagement from said keeper, said bushing being formed with a locking device in its outer free end.

3. In yieldable flexible couplings, coupling pins adapted to removably cooperate with recesses in coupling members and each comprising a spring connector and keepers connected to the ends of said connector, one of said keepers having a pivot extending therethrough and through the cooperating end of said connector, and a one piece drawn sheet metal bushing loosely mounted on said U-sectioned keeper and formed with a locking device in its outer free end.

4. The coupling pin adapted to removably cooperate with recesses in coupling members and comprising a spring connector and keepers loosely connected to the ends of said connector, one of said keepers being formed of U-sectioned metal extending around the end of said connector and having a pivotal connection therewith, and a sheet metal bushing loosely mounted on said U-sectioned keeper and having an inwardly projecting retainer flange to prevent disengagement from said keeper, said bushing being formed with a substantially closed stiffening outer free end comprising a reduced area integral locking projection having a locking slot.

5. The coupling pin adapted to removably cooperate with recesses in coupling members and comprising a spring connector and keepers loosely connected to the ends of said connector, and a bushing loosely mounted on one of said keepers and formed with a substantially closed stiffening outer free end comprising a reduced area integral locking projection.

6. The coupling pin adapted to removably cooperate with recesses in coupling members and comprising a laminated resilient connector and keepers loosely connected to the ends of said connector, and a sheet metal bushing loosely enclosing one of said keepers and having an inwardly projecting retainer member to prevent disengagement from said keeper, said bushing being adapted to be anchored within the cooperating coupling member.

7. The coupling pin adapted to removably cooperate with recesses in coupling members and comprising a resilient connector and keepers loosely connected to the ends of said connector, and a bushing loosely cooperating with one of said keepers, said bushing being adapted to be anchored within the cooperating coupling member and being formed with a locking device in its outer end.

8. The coupling pin adapted to removably cooperate with recesses in coupling members and comprising a spring connector and keepers loosely connected to one of the ends of said connector, and a bushing loosely mounted on said keepers and formed with a stiffening outer free end.

9. The coupling pin adapted to removably co-operate with recesses in coupling members and comprising a resilient connector and a keeper device loosely connected to one end of said connector, and a bushing loosely co-operating with said keeper device and having means to prevent its disengagement therefrom, said bushing being adapted to be mounted within the co-operating coupling member.

10. The coupling pin adapted to removably co-operate with recesses in coupling members and comprising a resilient connector and a keeper device loosely connected to one end of said connector, and a bushing loosely co-operating with said keeper device and having means to removably fasten said bushing within the co-operating coupling member.

JOHN J. SERRELL.
ALFRED W. SHEPHERD.